(12) United States Patent
Chien et al.

(10) Patent No.: US 8,935,480 B1
(45) Date of Patent: Jan. 13, 2015

(54) EFFICIENTLY CACHING DATA AT A CLIENT DEVICE

(75) Inventors: Mark Chien, Bellevue, WA (US); Sean Scott, Sammamish, WA (US); Devraj Varadhan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 13/346,016

(22) Filed: Jan. 9, 2012

(51) Int. Cl.
G06F 12/00 (2006.01)
G06F 13/00 (2006.01)
G06F 13/28 (2006.01)

(52) U.S. Cl.
USPC ............. 711/126; 709/219; 709/226; 707/10; 707/103; 707/203

(58) Field of Classification Search
None
See application file for complete search history.

(56) References Cited

U.S. PATENT DOCUMENTS 7,548,982 B2 * 6/2009 Gu et al. .................. 709/228
7,716,332 B1 * 5/2010 Topfl et al. .............. 709/226
8,504,411 B1 * 8/2013 Subasic et al. ............ 705/7.33
8,676,741 B2 * 3/2014 Ulinski et al. ............. 706/52
2004/0128618 A1 * 7/2004 Datta ....................... 715/513
2008/0288863 A1 * 11/2008 Bohannon ................. 715/255

* cited by examiner

Primary Examiner — Yaima Rigol
Assistant Examiner — Mohamed Gebril
(74) Attorney, Agent, or Firm — Lee & Hayes, PLLC (57) ABSTRACT

A merchant system computes various probabilities that visitors to a Web site will request individual Web pages of the Web site. The computed probabilities are then utilized to cache Web pages having the highest probabilities of being requested to a client device. The probability data may include aggregate probability data that defines the probability that any visitor to the Web site will request a Web page, customer segment probability data that defines the probability that customers in a particular customer segment will visit the Web pages, and/or customer-specific probability data that defines the probability that a specific customer of the Web site will visit the Web pages. Only Web pages having a computed probability greater than a caching threshold may be cached at the client device. Additionally, the Web pages may also be cached at the client device based upon the actual interaction with the Web site by a visitor.

17 Claims, 8 Drawing Sheets

EFFICIENTLY CACHING DATA AT A CLIENT DEVICE

BACKGROUND

An online merchant may provide a large number of products for sale to customers over the Internet. Customers may access information regarding the available products through a World Wide Web ("Web") site provided by the online merchant. Such a Web site may include Web pages with product information needed by a customer to identify and purchase a particular product, such as a description of the product, an image of the product, product specifications, the price and availability of the product, and a mechanism for initiating a purchase of the product.

In order to provide a high quality customer experience, the Web pages of an online merchant's Web site must be quickly delivered and displayed to customers. Various factors, however, may prevent Web pages from being quickly delivered and displayed. For example, most Web sites transmit Web pages to a customer device only in response to a request for a Web page, such as in response to a user selecting a hyperlink corresponding to the Web page. Depending upon the network bandwidth and latency to the customer's device, there may be a noticeable delay between the time the customer selects the hyperlink and the time the corresponding Web page is displayed to the customer. Additionally, the processing and/or storage capabilities of the customer device may be limited. This may be true, for instance, for portable client devices such as smartphones and tablet computing devices. These and other factors may prevent Web pages from being delivered and displayed to visitors to an e-commerce Web site in an efficient manner.

It is with respect to these and other considerations that the disclosure made herein is presented.

DETAILED DESCRIPTION

The following detailed description is directed to technologies for efficiently caching data at a client device, such as Web pages of an online merchant Web site. Through an implementation of the concepts and technologies disclosed herein, data can be selected for caching at the client device in a manner that attempts to maximize the likelihood that data requested by a user of the client device will be in a cache. Moreover, data can be cached at a client device in a manner that takes into account the network bandwidth to the client device, the capabilities of the client device, and potentially other factors. By efficiently caching data at a client device and satisfying requests from the cached data, a client device can present data to a user more quickly than if the data must be retrieved from a server.

According to aspects presented herein, a merchant system is disclosed that is configured to execute an online shopping module that provides a Web site for online shopping. The online shopping module is also configured to utilize a product database that stores product records for products available for purchase through the Web site. The Web site provides functionality for browsing and searching for Web pages corresponding to products in the product database and for performing other functions.

A client application is also provided for execution on a client device operated by a customer of the merchant system. The client application might be program code executing within a Web browser application, for instance, might be a stand-alone application program, or might be another type of program. The client application operates in conjunction with the online shopping module to cache Web pages provided by the online shopping module at the client device.

The client application receives a request for a Web page, such as from a user of the client device, and determines whether the requested Web page is stored in a local Web page cache. If the requested Web page is stored in the Web page cache, the client application retrieves the Web page from the cache and causes the Web page to be rendered and displayed. If the Web page is not stored in the local cache, the client application transmits a Web page request to the online shopping module for the requested Web page. When the requested Web page is subsequently returned, the client application renders and displays the requested Web page.

According to one embodiment, the online shopping module operates in conjunction with a caching module. The caching module is configured to perform various functions disclosed herein in an attempt to maximize the likelihood that requested Web pages are stored in the Web page cache. For example, in one embodiment the caching module is configured to compute various probabilities that visitors to the Web site will request individual Web pages of the Web site. The computed probabilities are then utilized to cache Web pages having the highest probabilities of being requested to a client device. The probabilities may be pre-computed or computed at the time a customer visits the Web site. As utilized herein, the term caching refers to a process of causing data to be stored in a cache at a client device. The data may encompass hypertext markup language ("HTML") documents, JAVASCRIPT and other types of interpretable or executable code, images, audio files, and other types of components.

In one embodiment, the caching module computes an aggregate probability for all or a portion of the Web pages of a Web site. The aggregate probability defines the probability that any visitor to the Web site will request a Web page. The aggregate probability for each Web page may be computed based upon the aggregate historical behavior of all or a significant portion of visitors to the Web site.

The caching module might also compute a customer segment probability for all or a portion of the Web pages of a Web site. The customer segment probability defines the probability that customers in a particular customer segment will visit the Web pages. For instance, the customer segment probability may define the probability that a Web site visitor identified as being in a "new moms" customer segment will visit a Web page. The customer segment probability may be computed for each page for any number of different customer segments and may be computed based upon past historical behavior of visitors to the Web site that have been identified as being a member of the customer segments.

The caching module might also compute a customer-specific probability for all or a portion of the Web pages of a Web site. The customer-specific probability defines the probability that a specific customer of the Web site will visit the Web pages. The customer-specific probability may be computed based upon past historical behavior of each customer at the Web site.

Once the aggregate probability data, the customer segment probability data, and the customer-specific probability data has been computed, the caching module may utilize this data to cause Web pages to be cached in a Web page cache at a client device. In one embodiment, Web pages are cached at the client device in highest-to-lowest probability order. In this way, the Web pages having the highest probability of being selected by the user are cached first. The Web pages may be cached at the client device asynchronously and in the background, so that a user of the client device is unaware that the caching is taking place. Additionally, as described above, the client application will satisfy Web page requests from the Web page cache when possible.

In one embodiment, the caching module utilizes the probability data to cache Web pages at a client device by first determining if sufficient information is available for a user of the client device to cache data using the customer-specific probabilities. For example, if a visitor to the Web site can be identified, such as through logging in to the Web site, then the caching module might utilize the customer-specific probabilities for the user to cache Web pages. As another example, the caching module might utilize the customer-specific probability data to cache the Web pages if a customer profile or sufficient browsing history is available for the Web site visitor to compute probabilities that the customer will visit individual Web pages.

If the customer-specific probability data cannot be utilized to cache Web pages to the client device, the caching module will attempt to utilize the customer segment probability data. The customer segment probability data can be utilized if a visitor to the Web site can be mapped to a customer segment. A visitor may be mapped to a customer segment even if only a small amount of information is known about the visitor. For instance, the caching module may still be able to map the visitor to a customer segment even if the caching module only knows the sex of the visitor or only has a very limited browsing history for the visitor. If the caching module can map the visitor to at least one customer segment, then the caching module will utilize the customer segment probability data for the segment to cache Web pages at the client device.

If neither the customer-specific probability data nor the customer segment probability data can be utilized, then the caching module will utilize the aggregate probability data to cache Web pages to the client device. As discussed above, the aggregate probability data defines the probability that any visitor to the Web site will request a Web page, and may be computed based upon the aggregate historical behavior of all or a significant portion of visitors to the Web site.

According to embodiments, the caching module also utilizes a caching threshold to determine which Web pages should be cached at the client device. The caching threshold specifies a threshold probability that Web pages must meet or exceed in order to be eligible for caching at a client device. For example, if the caching threshold is 60%, only Web pages having an associated aggregate, customer-specific, or customer segment probability of 60% or greater will be cached to a client device.

The caching threshold may be initially set based upon the size of the Web page cache at the client device (e.g. a higher caching threshold for a smaller cache), the network bandwidth and/or latency to the client device (e.g. a higher caching threshold for slower connections), and/or the type of client device (e.g. a higher caching threshold may be specified for a device with reduced computational capabilities like a wireless telephone). Other factors might also be utilized in setting the caching threshold.

According to other embodiments, the caching module is also configured to dynamically adjust the caching threshold based upon one or more cache performance metrics. For instance, the caching module might dynamically adjust the caching threshold in order to maximize the percentage of Web pages visited in a browsing session that are cached at the client device. The caching module might also dynamically adjust the caching threshold in order to maximize the percentage of Web pages that are cached at a client device and used by a visitor to the Web site. The caching module might also dynamically adjust the caching threshold to optimize other cache performance metrics.

In other implementations, the caching module might also be configured to cache Web pages to the client device based upon detected behavior of the user of the client device. This can be performed in addition to caching based upon the probability data as described above. For instance, the caching module may begin caching data to the client device based upon the aggregate, customer-specific, or customer segment probability data described above. The client application may then detect that the user has moved a mouse cursor into proximity of a hyperlink to a Web page and, in response, send an instruction to the caching module to cache the Web page. In this manner, a Web page may be cached at the client device just before a user selects the Web page. In a similar fashion, the client application might detect that a user is typing text into a search control on a Web page. In response thereto, the client application might instruct the caching module to cache Web pages based upon the partially typed search terms. Web pages might also be cached based upon actual detected user behavior at the Web site in other ways.

It should be appreciated that the embodiments disclosed herein might be utilized with any type of computer, computing system, device, Web site, application program, operating system, or other type of system or component. Accordingly, although the embodiments disclosed herein are primarily presented in the context of a merchant system that embodies the concepts disclosed herein for efficiently caching Web pages, the disclosure presented herein is not limited to such an implementation. For instance, the embodiments disclosed herein might be utilized in a similar fashion to cache product records and other types of data at a client device.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
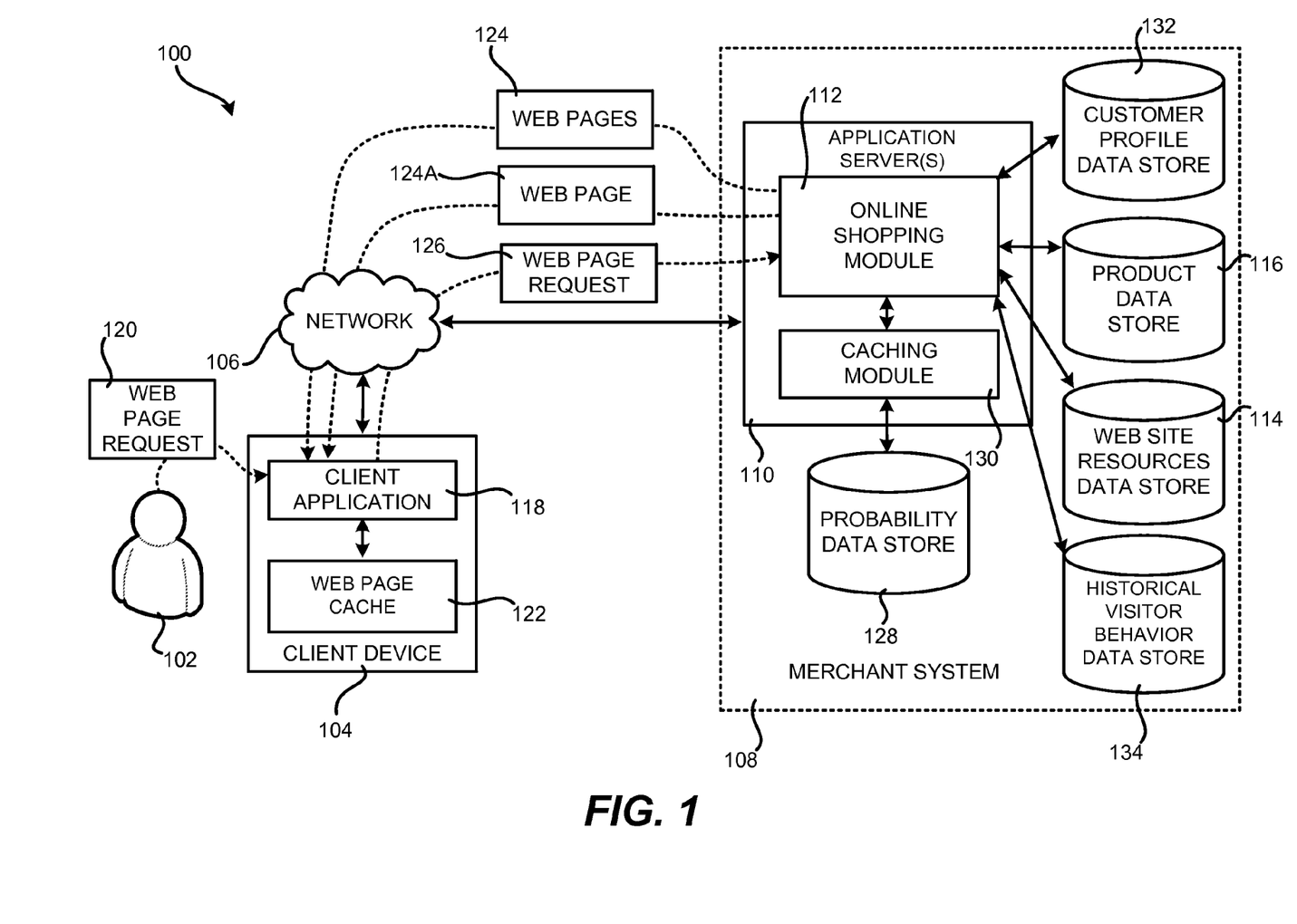
FIG. 1 is a system diagram showing aspects of one mechanism disclosed herein for caching data at a client device, according to one embodiment.

FIG. 1 and the following description are intended to provide a brief, general description of a suitable computing environment in which the embodiments described herein may be implemented. In particular, FIG. 1 is a system and network diagram that shows an illustrative operating environment 100 including several software components for efficiently caching data at a client device. As discussed above, the environment 100 is merely illustrative and the embodiments disclosed herein might be utilized in many different types of environments.

The environment 100 includes a user 102 that uses a client device 104 to access a merchant system 108 through a network 106. The user 102 may be an individual or entity that desires to browse, search, purchase, or has purchased, one or more products from the online merchant that operates the merchant system 108. The client device 104 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the merchant system 108. The user 102 might also be referred to herein as a "visitor" to the Web site provided by the merchant system 108 or a "customer" of the merchant system 108.

The network 106 may be a local-area network ("LAN"), a wide-area network ("WAN"), the Internet, or any other networking topology known in the art that connects the client device 104 to the merchant system 108. The merchant system 108 may include a number of application servers 110 that provide various online shopping services to the client device 104 over the network 106. The user 102 may use a client application 118 executing on the client device 104 to access and utilize the online shopping services provided by the application servers 110.

In one embodiment the client application 118 is program code that executes within an environment provided by a Web browser application, such as the MOZILLA® FIREFOX® Web browser from MOZILLA FOUNDATION of Mountain View, Calif. The client application 118 exchanges data with the application servers 110 in the merchant system 108 using the hypertext transfer protocol ("HTTP") or another appropriate protocol over the network 106. The client application 118 might also be a stand-alone client application configured for communicating with the application servers 110. The client application might also utilize any number of communication methods known in the art to communicate with the merchant system 108 and/or the application servers 110 across the network 106, including remote procedure calls, SOAP-based Web services, remote file access, proprietary client-server architectures, and the like.

The application servers 110 may execute a number of modules in order to provide the online shopping services and the other functionality disclosed herein to the client device 104. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for allowing the user 102 to browse, search, and purchase products available from the online merchant that operates the merchant system 108. For instance, the online shopping module 112 may retrieve information regarding a particular product offered for sale by the online merchant from a product database 114, generate a Web page 124A containing product information, and transmit the Web page 124A over the network 106 to the client application executing on the client device 104 for display to the user 102. Information regarding each product offered for sale might be stored in a product database 116 maintained by the merchant system 108.

As shown in FIG. 1, the online shopping module 112 might utilize stored Web site resources 114 to provide an online shopping Web site or other type of information service to the client application 118. The Web site resources 114 might include, for instance, Web pages, images, text files, program code for generating Web pages, metadata, scripts, executable code, and other types of data utilized to create and/or provide a Web page. As will be described in detail below, some or all of the Web site resources 114 may be cached at the client device 104 in a Web page cache 122.

When the client application 118 receives a Web page request 120 from the user 102, the client application 118 determines whether the requested Web page is stored in the Web page cache 122. If so, the client application 118 utilizes the Web page 122 stored in the Web page cache 122 rather then requesting the Web page from the merchant system 108. If the requested Web page is not stored in the Web page cache 122, the client application 118 transmits a Web page request 126 to the online shopping module 112. In turn, the online shopping module 112 retrieves or generates the requested Web page 124A and transmits the Web page 124A to the client application 118. The client application 118 then renders the Web page 124A and displays the rendered Web page 124A to the user 102 in response to the Web page request 120.

In one embodiment, the online shopping module 112 operates in conjunction with a caching module 130 to cache Web pages 124 in the Web page cache 112. It should be appreciated that the functions described herein as being performed by the caching module 130 may be performed directly by the online shopping module 112 in other embodiments. Another component might also perform the functionality described herein as being performed by the caching module 130.

The caching module 130 executes on the application servers 110 and is configured to perform various functions disclosed herein in an attempt to maximize the likelihood that Web pages requested by a user 102 are stored in the Web page cache 122 prior to receiving a request for the Web pages. For example, in one embodiment the caching module 130 is configured to compute various probabilities that visitors to the Web site provided by the merchant system 108 will request individual Web pages of the Web site. The computed probabilities are stored in a probability data store 128 and utilized to cache Web pages having the highest probabilities of being requested to the client device 102. The probabilities may be pre-computed or computed at the time a customer visits the Web site.

As will be described in detail below, the various probabilities computed by the caching module 130 may be based upon the historical browsing patterns of users of the Web site provided by the merchant system 108. For instance, the probability that a particular user 102 might request a Web page 124A might be based upon the historical usage patterns of the user 102. Similarly, the probability that a user identified as being in a particular customer segment will request a particular Web page 124A might be computed based upon the historical browsing behavior of other users in the same customer segment. Likewise, the probability that any arbitrary user of the Web site will request a particular Web page 124A might be computed based upon the aggregate historical behavior of all or a statistically significant portion of visitors to the Web site provided by the merchant system 108.

In one embodiment, the online shopping module 112 captures the browsing behavior of visitors to the Web site provided by the merchant system 108. Data describing the historical browsing behavior of the visitors may then be stored in the historical visitor behavior data store 134. This data may then be utilized by the caching module 130 in the manner described herein to compute the various probabilities described below. The probabilities can then be utilized to identify Web pages 124 that should be cached at a particular user's client device 104. Additional details regarding this process are provided below with regard to FIGS. 2-6.

As shown in FIG. 1, the online shopping module 112 might also maintain a customer profile data store 132 for storing customer profiles for the customers of the merchant system 108. Each customer profile might store information about a customer of the merchant system 108, such as the customer's name, address, credit card information, browsing and purchase history, preferences, and other information. As will be described in greater detail below, this information might be utilized in order to identify Web pages that a particular user is likely to request from the merchant system 108 and to cause the identified Web pages to be cached at the user's client device 104.

In some implementations, the client application 118 and the caching module 130 are configured to also cache Web pages 124 to the client device 104 based upon the detected behavior of the user 102 of the client device 104. This can be performed in addition to caching based upon the probability data as described above. For instance, the caching module 130 may begin caching data to the client device 104 based upon the aggregate, customer-specific, or customer segment probability data described above. The client application 118 may then detect that the user 102 has moved a mouse cursor into proximity of a hyperlink to a Web page 124A and, in response, send an instruction to the caching module 130 to cache the Web page 124A. In this manner, a Web page 124A may be cached at the client device 104 just before the user 102 requests the Web page 124A. In a similar fashion, the client application 118 might detect that the user 102 is typing text into a search control on a Web page 124A. In response thereto, the client application 118 might instruct the caching module 130 to begin caching Web pages 124 to the client device 104 based upon the partially typed search terms. Web pages 124 might also be cached based upon actual detected user behavior at the Web site in other ways.

Figure 2:
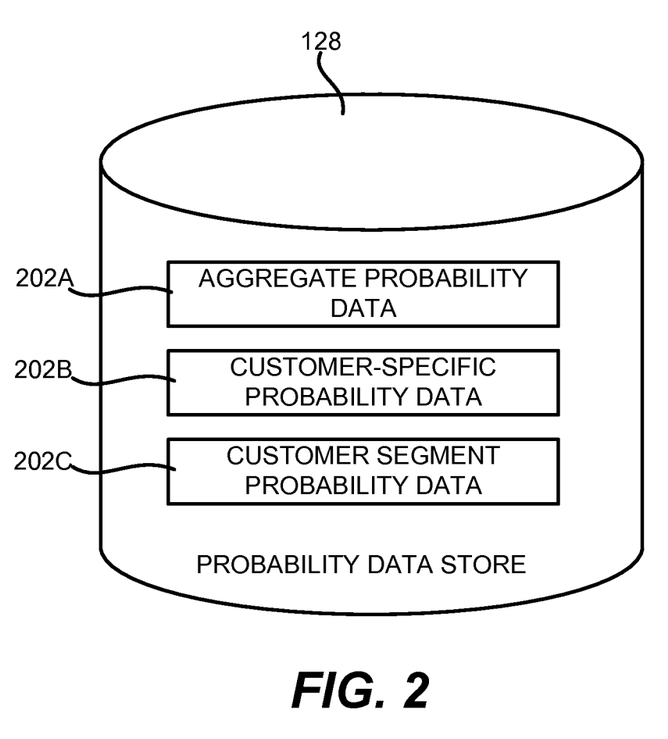
FIG. 2 is a data store diagram illustrating aspects of a data store containing probability data that may be utilized in the various embodiments disclosed herein for caching data at a client device.

FIG. 2 is a data store diagram illustrating aspects of a probability data store 128 containing probability data that may be utilized by the caching module 130 in the various embodiments disclosed herein for caching data at a client device 104. As shown in FIG. 2, the probability data store 128 is configured to store aggregate probability data 202A, customer-specific probability data 202B, and customer segment probability data 202C in one embodiment disclosed herein. Each of these types of probability data will be described in greater detail below.

The aggregate probability data 202A defines the probability that any visitor to the Web site will request a Web page. The aggregate probability for each Web page may be computed based upon the aggregate historical behavior of all or a significant portion of visitors to the Web site. As discussed above, data describing the historical browsing behavior of visitors to the Web site provided by the merchant system 108 might be stored in the historical visitor behavior data store 134. The caching module 130 might compute an aggregate probability for all or a portion of the Web pages 124 of the Web site.

The customer-specific probability data 202B defines the probability that a specific customer of the Web site will visit Web pages. As mentioned above, the customer-specific probability data 202B may be computed based upon past historical behavior of each customer of the Web site. The customer-specific probability data 202B might also be computed based upon other information associated with a customer, such as data stored in a customer profile in the customer profile data store 132. The caching module might compute a customer-specific probability for all or a portion of the Web pages of the Web site provided by the merchant system 108 for each customer.

The customer segment probability data 202C defines the probability that customers in a particular customer segment will visit the Web pages of the Web site provided by the merchant system 108. For instance, the customer segment probability may define the probability that a user 102 identified as being in a "new moms" customer segment will visit a Web page. The customer segment probability may be computed for each Web page for any number of different customer segments and, as discussed above, may be computed based upon past historical behavior of visitors to the Web site that have been identified as being a member of the customer segments. The caching module 130 might also compute a customer segment probability for all or a portion of the Web pages of the Web site. Additional details regarding the computation of the aggregate probability data 202A, the customer-specific probability data 202B, and the customer segment probability data 202C will be provided below with regard to FIGS. 3A-3C and 4.

Figure 3A:
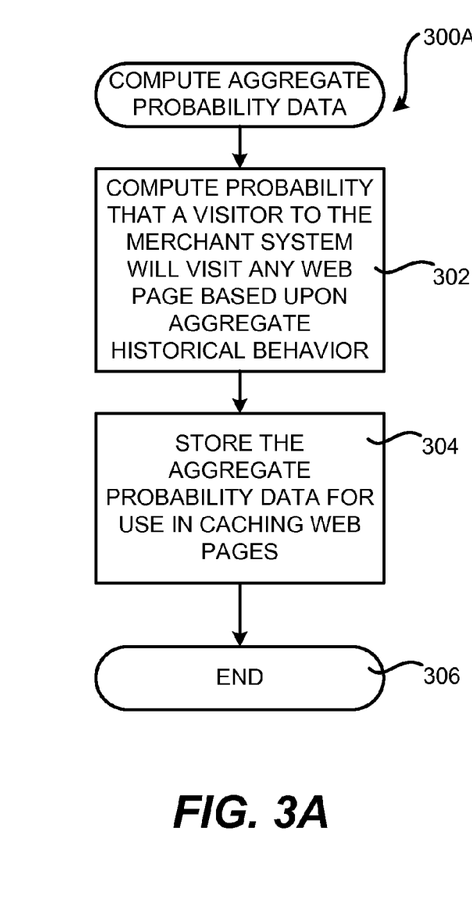
FIGS. 3A-3C are flow diagrams showing aspects of various mechanisms for computing probability data for use in caching data at a client device, according to several embodiments disclosed herein.
Figure 3B:
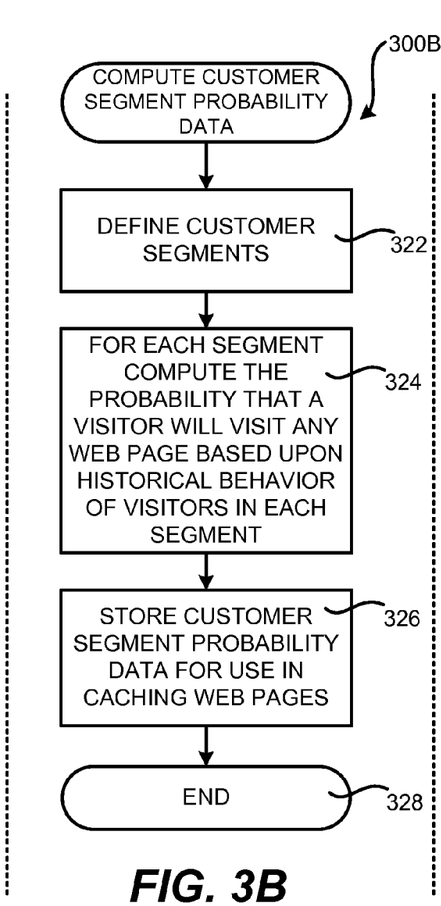
Figure 3C:
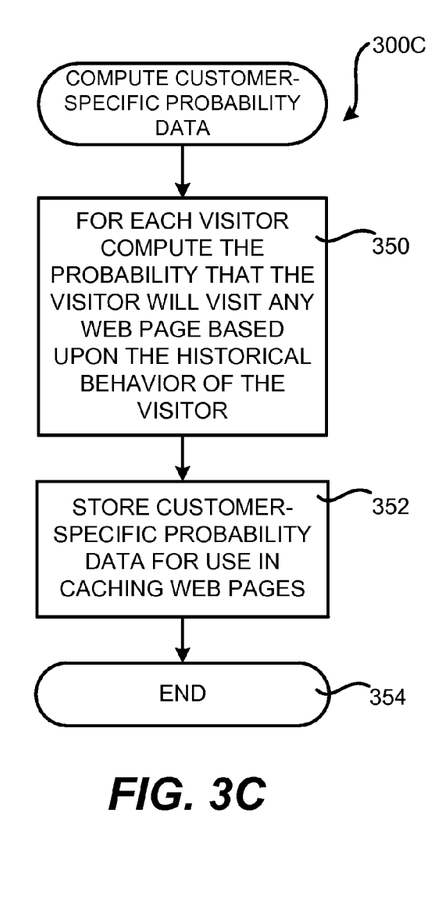

Turning now to FIGS. 3A-3C, additional details will be provided regarding the embodiments described herein for caching data at a client device 104. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3A is a flow diagram showing a routine 300A that illustrates aspects of one mechanism for generating the aggregate probability data 202A. The routine 300A begins at operation 302, where the caching module 130 utilizes data stored in the historical visitor behavior data store 134 to compute an aggregate probability for one or more of the Web pages of the Web site provided by the merchant system 108. In particular, the caching module 130 computes the probability that any arbitrary visitor to the Web site will visit each page based upon the aggregate historical behavior of visitors to the Web site. For example, if 5000 visitors have previously visited the Web site's main page and 1000 of those visitors selected a hyperlink to a sale page, then the aggregate probability for the sale page would be computed as 20% ($^{1000}/_{5000}$).

Once the aggregate probability data 202A has been computed at operation 302, the routine 300A proceeds to operation 304 where the caching module 130 stores the aggregate probability data 202A in the probability data store 128. As will be described in detail below, the caching module 130 may utilize the aggregate probability data 202A to cache Web pages 124 to a client device 104. From operation 304, the routine 300A proceeds to operation 306, where it ends.

FIG. 3B is a flow diagram showing a routine 300B that illustrates aspects of one mechanism for generating the customer segment probability data 202C. The routine 300B begins at operation 322, where one or more customer segments are defined. As discussed briefly above, customer segments may be utilized to subdivide customers of the merchant system 108 into various categories. For instance, separate customer segments might be defined for men and women customers. Customer segments might also be defined based upon shopping patterns, such customers that shop for luxury items or gadgets. Customer segments might also be based upon various other factors. From operation 322, the routine 300B proceeds to operation 324.

At operation 324, the caching module 130 utilizes data stored in the historical visitor behavior data store 134 to compute one or more customer segment probabilities for one or more of the Web pages of the Web site provided by the merchant system 108. In particular, the caching module 130 computes the probability that a visitor to the Web site that is identified as being in a particular customer segment will visit each page based upon the aggregate historical behavior of visitors to the Web site in each segment. For example, if 2500 visitors in a particular customer segment have previously visited the Web site's main page and 1000 of those visitors selected a hyperlink to a sale page, then the customer segment probability for the sale page for customers in the segment would be computed as 40% ($^{1000}/_{2500}$).

Once the customer segment probability data 202C has been computed at operation 324, the routine 300B proceeds to operation 326 where the caching module 130 stores the customer segment probability data 202C in the probability data store 128. As will be described in detail below, the caching module 130 may utilize the customer segment probability data 202C to cache Web pages 124 to a client device 104. From operation 326, the routine 300B proceeds to operation 328, where it ends.

FIG. 3C is a flow diagram showing a routine 300C that illustrates aspects of one mechanism for generating the customer-specific probability data 202B. The routine 300C begins at operation 350, where the caching module 130 computes a customer-specific probability for one or more of the Web pages of the Web site provided by the merchant system 108. In particular, the caching module 130 computes the probability that specific customers of the Web site will visit each page based upon the specific historical behavior of the customers. In this regard, the caching module 130 might utilize information stored in the historical visitor behavior data store 134, the customer profile data store 132, and/or other data to compute the customer-specific probability data 202B. For example, if a particular customer has previously visited the Web site's main page 10 times and selected a hyperlink to a sale page 5 times, then the customer-specific probability for the sale page would be computed as 50% ($^{5}/_{10}$). It should be appreciated that a customer-specific probability may be computed for each page for each customer of the merchant system 108.

Once the customer-specific probability data 202B has been computed at operation 350, the routine 300C proceeds to operation 352 where the caching module 130 stores the customer-specific probability data 202B in the probability data store 128. As will be described in detail below, the caching module 130 may utilize the customer-specific probability data 202B to cache Web pages 124 to a client device 104. From operation 352, the routine 300C proceeds to operation 354, where it ends.

Figure 4:
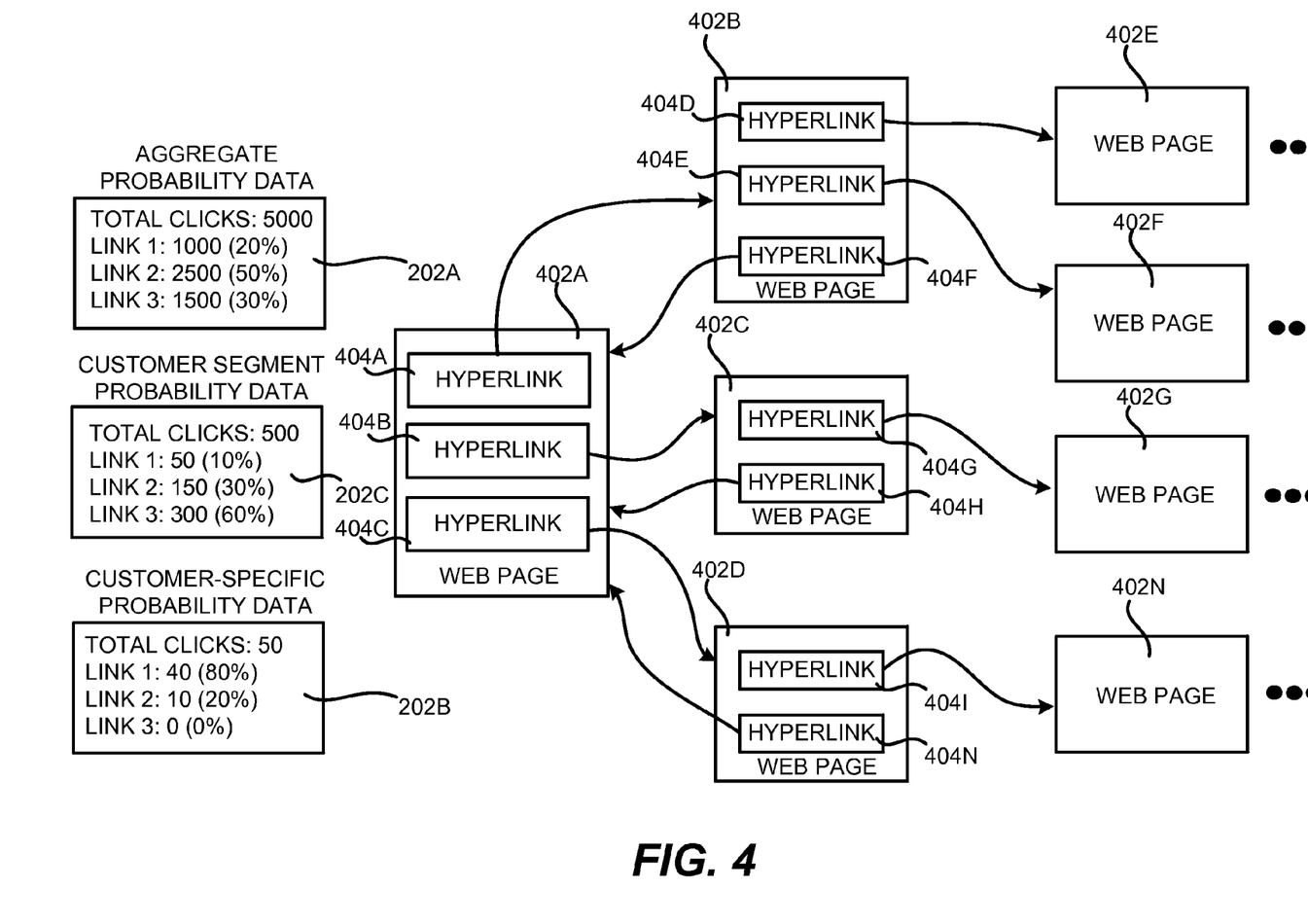
FIG. 4 is a Web site diagram showing aspects of one illustrative Web site, along with illustrative probability data utilized to cache pages of the Web site at a client device in one embodiment disclosed herein.

FIG. 4 is a Web site diagram showing aspects of one illustrative Web site, along with illustrative probability data utilized to cache pages of the Web site at a client device 104 in one embodiment disclosed herein. The illustrative Web site shown in FIG. 4 is illustrated as a collection of Web pages 402A-402N. Each of the Web pages 402A-402N shown in FIG. 4 is illustrated as having one or more hyperlinks 404A-404N to other Web pages 402A-402N of the Web site. For instance, the Web page 402A includes a hyperlink 404A to the Web page 402B, a hyperlink 404B to the Web page 402C, and a hyperlink 404C to the Web page 402D. The Web page 402B has a hyperlink 404D to the Web page 402E, a hyperlink 404E to the Web page 402F, and a hyperlink 404F back to the Web page 402A. The Web page 402C has a hyperlink 404G to the Web page 402G and a hyperlink 404H back to the Web page 402A. The Web page 402D has a hyperlink 404I to the Web page 402N and a hyperlink 404N back to the Web page 402A.

Illustrative aggregate probability data 202A, customer-specific probability data 202B, and customer segment probability data 202C is also illustrated in FIG. 4 for the Web page 402A. In the example shown in FIG. 4, the hyperlinks on the Web page 402A have been selected 5000 times by visitors to the Web page 402A. Of those 5000 selections, the hyperlink 404A was selected 1000 times, the hyperlink 404B was selected 2500 times, and the hyperlink 404C was selected 1500 times. Accordingly, the aggregate probability for the Web page 402B is computed as 20% ($^{1000}/_{5000}$), the aggregate probability for the Web page 402C is computed as 50% ($^{2500}/_{5000}$), and the aggregate probability for the Web page 402D is computed as 30% ($^{1500}/_{5000}$). It should be appreciated that the aggregate probability for the other Web pages 402B-402N might be computed in a similar fashion.

FIG. 4 also illustrates the computation of a customer segment probability. In particular, in the example shown in FIG. 4, customers within a particular segment have selected hyperlinks on the Web page 402A 500 times. Of those 500 selections, the hyperlink 404A was selected 50 times, the hyperlink 404B was selected 150 times, and the hyperlink 404C was selected 300 times. Accordingly, the customer segment probability for the Web page 402B for the customer segment is computed as 10% ($^{50}/_{500}$), the customer segment probability for the Web page 402C is computed as 30% ($^{150}/_{500}$), and the customer segment probability for the Web page 402D is computed as 60% ($^{300}/_{500}$). It should be appreciated that the customer segment probability for the other Web pages 402B-402N and for other customer segments might be computed in a similar fashion.

FIG. 4 also illustrates the computation of a customer-specific probability. In particular, in the example shown in FIG. 4, a particular customer has selected hyperlinks on the Web page 402A 50 times. Of those 50 selections, the hyperlink 404A was selected 40 times, the hyperlink 404B was selected 10 times, and the hyperlink 404C was selected zero times. Accordingly, the customer-specific probability for the Web page 402B for the particular customer is computed as 80% ($^{40}/_{50}$), the customer-specific probability for the Web page 402C is computed as 20% ($^{10}/_{50}$), and the customer-specific probability for the Web page 402D is computed as 0% ($^{0}/_{50}$). It should be appreciated that the customer-specific probability for the other Web pages 402B-402N and for other customers might be computed in a similar fashion. It should also be appreciated that the Web site shown in FIG. 4 is merely illustrative and that probabilities might be computed in a similar fashion for other Web sites having more or fewer pages or having a different configuration altogether.

Figure 5A:
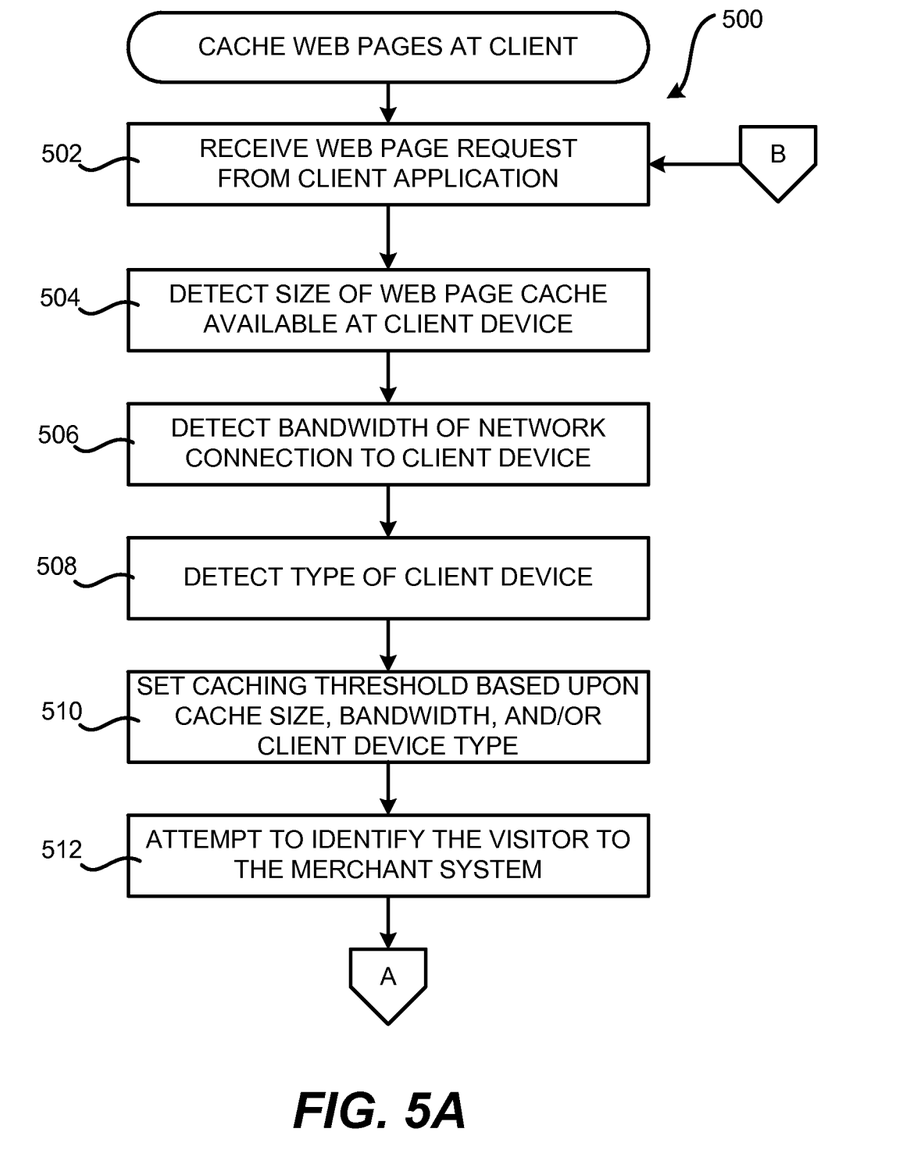
FIGS. 5A-5B are flow diagrams showing aspects of one mechanism for caching Web pages at a client device according to one embodiment disclosed herein.
Figure 5B:
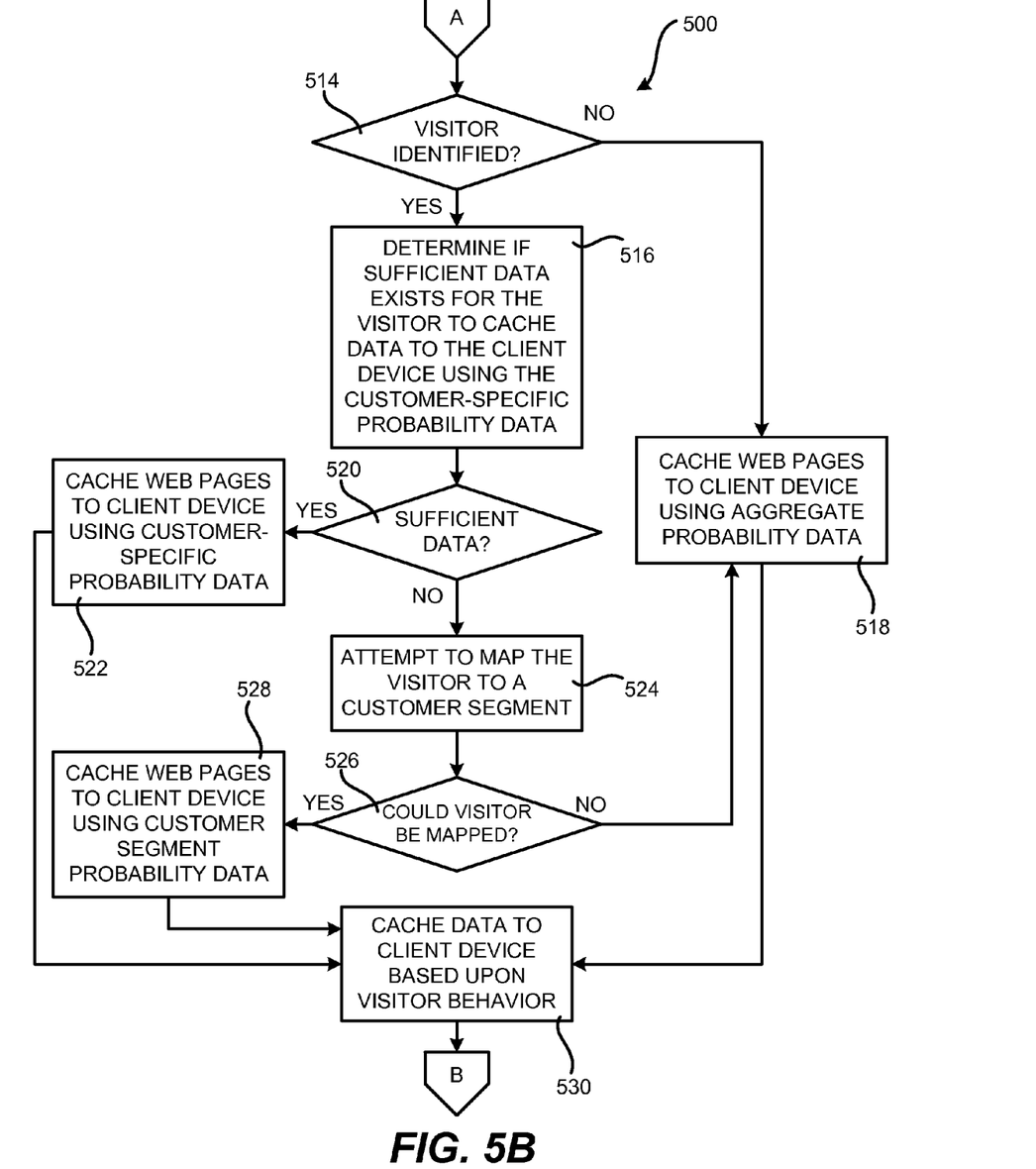

FIGS. 5A-5B are flow diagrams showing aspects of one routine 500 for caching Web pages at a client device 104 according to one embodiment disclosed herein. The routine 500 begins at operation 502, where the online shopping module 112 receives a Web page request 120 from a client device 104. In response to receiving the Web page request 120, the online shopping module 112 may instruct the caching module 130 to begin caching Web pages 124 at the client device 104. As mentioned above, the caching of Web pages may occur asynchronously and in the background while the user 102 browses the Web site provided by the merchant system 108. In this manner, the user 102 may be unaware that the caching is occurring.

From operation 502, the routine 500 proceeds to operation 504 where the caching module 130 detects the size of the Web page cache 122 at the client device 104. The online shopping module 130 may communicate with the client application 118 to detect the size of the Web page cache 122. The size of the Web page cache 122 might also be detected in another manner. As will be described in greater detail below, the size of the Web page cache 122 might be utilized to set a caching threshold that specifies a threshold probability that Web pages must meet or exceed in order to be eligible for caching at a client device 104. From operation 504, the routine 500 proceeds to operation 506.

At operation 506, the caching module 130 detects the bandwidth of the connection to the client device 104 over the network 106. This may be accomplished, for instance, by transmitting a file to the client device 104 and determining how long the transmission takes. Other mechanisms might also be utilized to detect the bandwidth of the network connection to the client device 104. As will be described in greater detail below, the bandwidth to the client device 104 might also be utilized to set the caching threshold.

From operation 506, the routine 500 proceeds to operation 508 where the caching module 130 detects the type of the client device 104. For instance, the client application 118 may inform the caching module 130 that the client device 104 is a standard desktop or laptop computer, a tablet computing device, or a smartphone. Using this information, the caching module 130 might cause different types of Web pages to be cached at the client device 104. For instance, if the client device 104 is a smartphone, the caching module 130 might cache Web pages configured for consumption on a mobile device to the client device 104. Additionally, the caching module 130 might also utilize the device type to set the caching threshold as will be described below.

From operation 510, the caching module 130 sets an initial caching threshold. As mentioned above, the caching threshold specifies a threshold probability that Web pages must meet or exceed in order to be eligible for caching at a client device 104. The caching threshold may be initially set based upon the size of the Web page cache 122 at the client device 104 (e.g. a higher caching threshold for a smaller cache), the network bandwidth and/or latency to the client device 104 (e.g. a higher caching threshold for slower connections), and/or the type of client device 104 (e.g. a higher caching threshold may be specified for a device with reduced computational capabilities like a wireless telephone). Other factors might also be utilized in setting the caching threshold. As will be described in greater detail below with regard to FIG. 6, the caching module 130 might also dynamically adjust the caching threshold based upon one or more cache performance metrics.

From operation 510, the routine 500 proceeds to operation 512 where the caching module 130 attempts to identify the user 102 of the client device 104. Various mechanisms might be utilized to identify the user 102. For instance, the user 102 might have logged into the merchant system 108 with a username and password. In this case, the user has self-identified. In other scenarios, the user 102 might be identified based upon a tracking "cookie" or other type of persistent data stored at the client device 104 by the merchant system 108. Other mechanisms might also be utilized to identify the user 102.

From operation 512, the routine 500 proceeds to operation 514, where the caching module 130 determines whether it was able to identify the user 102. If the caching module 130 is unable to identify the user 102, the routine 500 proceeds to operation 518, where the caching module 130 utilizes the aggregate probability data 202A to cache the Web pages to the client device 104. As mentioned above, only pages having an aggregate probability greater than the caching threshold may be cached at the client device 104. Additionally, Web pages may be cached at the client device in a highest-to-lowest probability order. In this way, Web pages having the highest probability of being selected by the user 102 will be cached first. Web pages will also only be cached up to the detected size of the Web page cache 122. From operation 518, the routine 500 proceeds to operation 530, described below.

If, at operation 514, the caching module 130 determines that the user 102 could be identified, then the routine 500 proceeds from operation 514 to operation 516. At operation 516, the caching module 130 determines whether sufficient information exists for the user 102 in order to cache the Web pages to the client device 104 using the customer-specific probability data 202B. For instance, if the customer has a completed user profile and the caching module 130 has access to some amount of browsing history for the user 102, then the caching module 130 may be able to utilize the customer-specific probability data 202B. If the caching module 130 has little information about the user 102, then it may not be possible for the caching module 130 to utilize the customer-specific probability data 202B.

If the caching module 130 determines that the customer-specific probability data 202B can be utilized, the routine 500 proceeds from operation 520 to operation 522. At operation 522, the caching module 130 utilizes the customer-specific probability data 202A for the user 102 to cache the Web pages to the client device 104. Only pages having a customer-specific probability greater than the caching threshold may be cached at the client device 104, Web pages may be cached at the client device 104 in a highest-to-lowest probability order, and Web pages may only be cached at the client device 104 up to the detected size of the Web page cache 122. From operation 522, the routine 500 proceeds to operation 530, described below.

If, at operation 520, the caching module 130 determines that insufficient data is available for the user 102 to utilize the customer-specific probability data 202B, the routine 500 proceeds from operation 520 to operation 526. At operation 526, the caching module 130 attempts to map the user 102 to one of the customer segments defined at operation 322, described above. As mentioned briefly above, a user 102 may be mapped to a customer segment even if only a small amount of information is known about the user. For instance, the caching module 130 may still be able to map the user 102 to a customer segment even if the caching module 130 only knows the sex of the user or only has a very limited browsing history for the user.

If the caching module 130 can map the user 102 to at least one customer segment, then the routine 500 proceeds from operation 526 to operation 528. At operation 528, the caching module 130 utilizes the customer segment probability data 202C for the identified segment to cache Web pages at the client device 104. Only pages having a customer segment probability greater than the caching threshold may be cached at the client device 104, Web pages may be cached at the client device 104 in a highest-to-lowest probability order, and Web pages may only be cached at the client device 104 up to the detected size of the Web page cache 122. From operation 526, the routine 500 proceeds to operation 530, described below.

If, at operation 526, the caching module 130 determines that the user 102 could not be mapped to any customer segment, then the routine 500 proceeds from operation 526 to operation 518. As described above, Web pages 124 are cached to the client device 104 utilizing the aggregate probability data 202A at operation 518. From operation 518, the routine 500 proceeds to operation 530.

At operation 520, the caching module 130 caches Web pages 124 to the client device 104 based upon detected behavior of the user 102 of the client device 104. As mentioned briefly above, this caching can be performed in addition to caching based upon the probability data described above. For instance, the caching module 130 may begin caching Web pages 124 to the client device 104 based upon the aggregate, customer-specific, or customer segment probability data described above. The client application 118 may then detect that the user 102 has moved a mouse cursor into proximity of a hyperlink to a Web page 124A and, in response, send an instruction to the caching module 130 to cache the Web page 124A. In this manner, a Web page 124A may be cached at the client device 102 just before a user selects the Web page 124A. In a similar fashion, the client application 118 might detect that the user 102 is typing text into a search control on a Web page 124A. In response thereto, the client application 118 might instruct the caching module 130 to cache Web pages 124 based upon the partially typed search terms. Web pages 124 might also be cached based upon actual detected user behavior at the Web site in other ways. From operation 530, the routine 500 proceeds to operation 502, described above where caching of Web pages 124 might continue in the manner described above.

It should be appreciated that the mechanism utilized to cache Web pages 124 at the client device 104 might change during a single browsing session. For example, the aggregate probability data 202A might be initially used to cache data at the client device 104 of a user that had never previously visited the Web site. After a period of browsing, the caching module 130 might be able to map the user 102 to one or customer segments. After the user 102 is mapped to at least one customer segment, the caching module 130 might begin utilizing the customer segment probability data 202C to cache the Web pages at the client device 104. After an additional period, the caching module 130 might have sufficient information about the user 102 to begin utilizing the customer-specific probability data 202B. Regardless of which probability data is utilized, the caching module 130 might also cache data to the client device 104 based upon the actual behavior of the user 102 in the manner described above.

Figure 6:
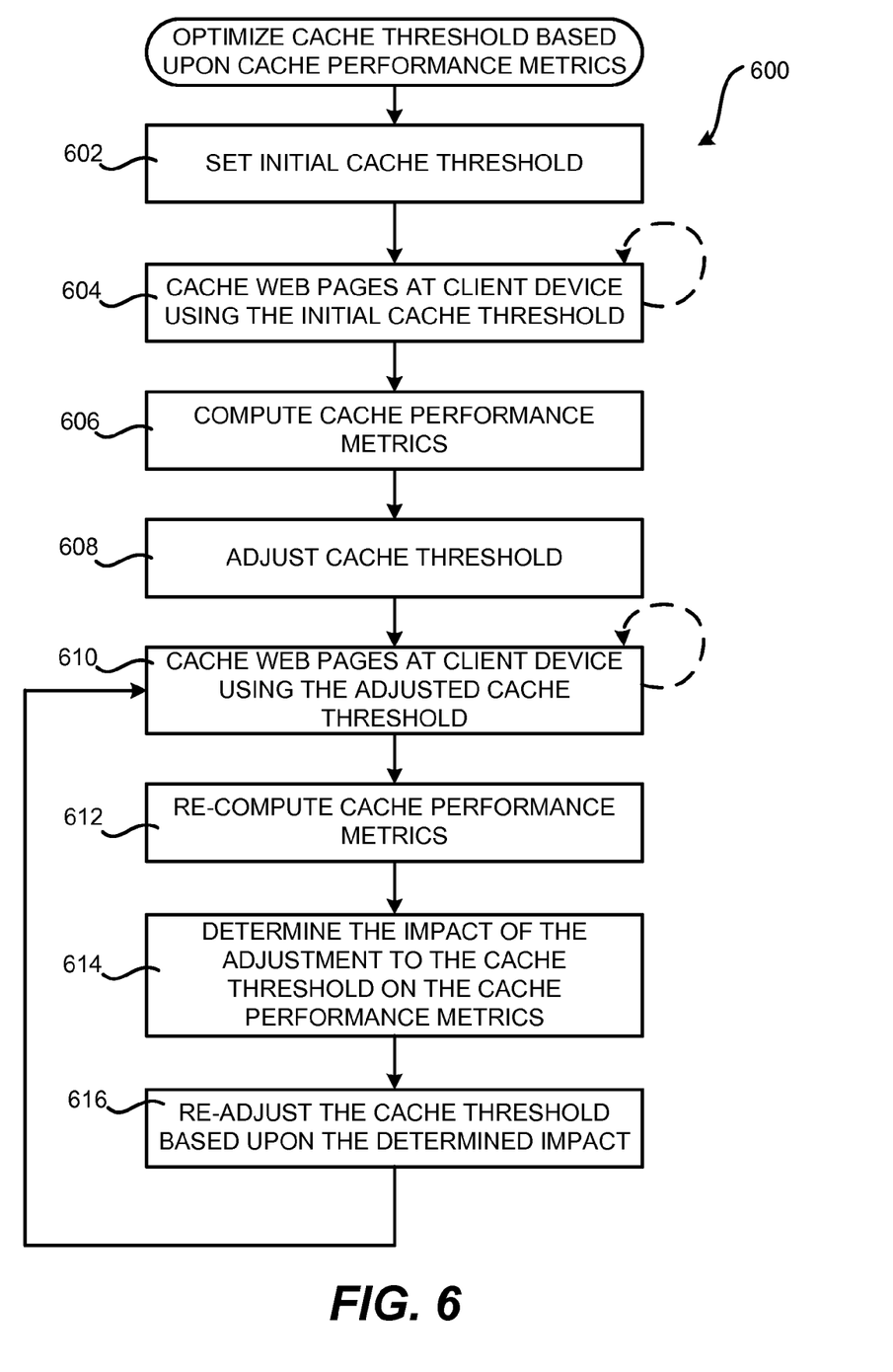
FIG. 6 is a flow diagram showing aspects of one routine for optimizing a caching threshold based upon cache performance metrics in one embodiment disclosed herein.

FIG. 6 is a flow diagram showing aspects of one routine 600 for optimizing a caching threshold based upon cache performance metrics in one embodiment disclosed herein. As discussed briefly above, the caching module 130 may also be configured to dynamically adjust the caching threshold based upon one or more cache performance metrics. For instance, the caching module 130 might dynamically adjust the caching threshold in order to maximize the percentage of Web pages 124 visited in a browsing session that are cached at the client device 104. The caching module 130 might also dynamically adjust the caching threshold in order to maximize the percentage of Web pages 124 that are cached at a client device 104 and used by a visitor to the Web site. One illustrative routine 600 for adjusting the caching threshold is shown in FIG. 6 and described below.

The routine 600 begins at operation 602, where the caching module 130 sets an initial caching threshold. The initial caching threshold may be based upon the bandwidth to the client device 104, the size of the Web page cache 122, and/or the type of the client device 104 in the manner described above. Alternately, the initial caching threshold might be set randomly or to a fixed value. The initial caching threshold might also be set in other ways.

From operation 602, the routine 600 proceeds to operation 604, where the caching module 130 caches Web pages 124 at the client device 104 in the manner described above. The caching of Web pages 124 may proceed in this manner for a period of time, such as an hour, a day, a month, etc. Caching should continue long enough to obtain a statistically significant measure of the effectiveness of the initial caching threshold.

From operation 604, the routine 600 proceeds to operation 606, where the caching module 130 computes the value of one or more cache performance metrics. For instance, in one embodiment the caching module 130 computes the percentage of Web pages 124 visited in each browsing session that are cached at a client device 104 and the percentage of Web pages 124 that are cached at a client device 104 and used by a visitor to the Web site during a browsing session. Other cache performance metrics might also be computed.

Once values for the cache performance metrics have been computed, the routine 600 proceeds to operation 608, where the caching module 130 adjusts the caching threshold. The caching threshold may be adjusted up or down, and may be adjusted using small increments (e.g., 1% or less than 1%) or large increments (e.g., 5% or greater).

From operation 610, the routine 600 proceeds to operation 610, where the Web pages 124 are cached using the adjusted caching threshold for a period of time. The routine 600 then continues to operation 612, where the cache performance metrics computed at operation 606 are again computed.

The routine 600 then continues from operation 612 to operation 614, where the caching module 130 determines the impact of the adjustment to the caching threshold on the cache performance metrics. At operation 616, the caching module 130 adjusts the caching threshold based upon the determine impact. For instance, if the caching threshold was adjusted upward and the cache performance metrics were improved, the caching module 130 might continue to adjust the caching threshold upward. If the caching threshold was adjusted upward and the cache performance metrics fell, then the caching threshold might be adjusted downward.

From operation 616, the routine 600 proceeds to operation 610, where the process described above is repeated. In this manner, the caching module 130 can continue to adjust the caching threshold based upon the cache performance metrics until the cache performance metrics have been optimized.

Figure 7:
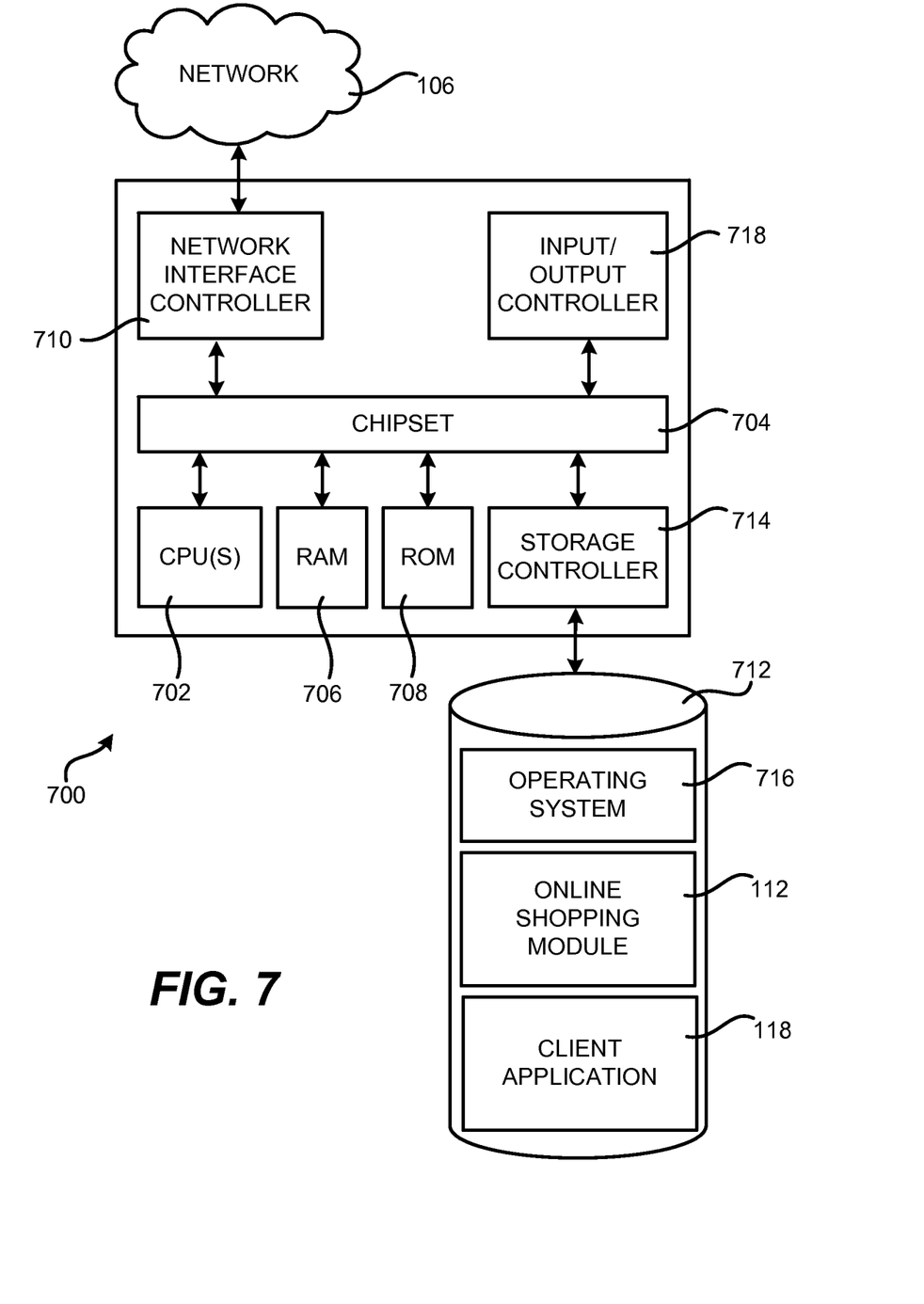
FIG. 7 is a computer architecture diagram showing one illustrative computer hardware architecture for use in computing devices configured to implement the concepts and technologies disclosed herein in one embodiment.

FIG. 7 shows an example computer architecture for a computer 700 capable of executing the software components described herein for caching data at a client device 104 in the manner presented above. The computer architecture 700 shown in FIG. 7 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the client device 104, or other computing platform.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 704. The CPUs 702 are standard programmable processors that perform arithmetic and logical operations necessary for the operation of the computer 700.

The CPUs 702 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 704 provides an interface between the CPUs 702 and the remainder of the components and devices on the baseboard. The chipset 704 may provide an interface to a random access memory ("RAM") 706, used as the main memory in the computer 700. The chipset 704 may further provide an interface to a computer-readable storage medium such as a read-only memory ("ROM") 708 or non-volatile RAM ("NVRAM") for storing basic routines that that help to startup the computer 700 and to transfer information between the various components and devices. The ROM 708 or NVRAM may also store other software components necessary for the operation of the computer 700 in accordance with the embodiments described herein.

According to various embodiments, the computer 700 may operate in a networked environment using logical connections to remote computing devices and computer systems through a network, such as a local-area network ("LAN"), a wide-area network ("WAN"), the Internet, or any other networking topology known in the art that connects the computer 700 to remote computers. The chipset 704 includes functionality for providing network connectivity through a network interface controller ("NIC") 710, such as a gigabit Ethernet adapter.

For example, the NIC 710 may be capable of connecting the computer 700 to other computing devices, such as the application servers 110, the client device 104, a data storage system in the merchant system 108, and the like, over the network 106 described above in regard to FIG. 1. It should be appreciated that multiple NICs 710 may be present in the computer 700, connecting the computer to other types of networks and remote computer systems.

The computer 700 may be connected to a mass storage device 712 that provides non-volatile storage for the computer. The mass storage device 712 may store system programs, application programs, other program modules, and data, which have been described in greater detail herein. The mass storage device 712 may be connected to the computer 700 through a storage controller 714 connected to the chipset 704. The mass storage device 712 may consist of one or more physical storage units. The storage controller 714 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage, or the like.

For example, the computer 700 may store information to the mass storage device 712 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 712 by detecting the physical states or characteristics of one or more particular locations within the physical storage units.

In addition to the mass storage device 712 described above, the computer 700 might have access to other computer-readable media to store and retrieve information, such as program modules, data structures, or other data. It should be appreciated by those skilled in the art that computer-readable media can be any available media that may be accessed by the computer 700, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 712 may store an operating system 716 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 712 may store other system or application programs and data utilized by the computer 700. For instance, when utilized to implement the client device 104, the mass storage device may store the client application 118 and the web page cache 122. When utilized to implement one or more of the application servers 110, the mass storage device may store the online shopping module 112 and/or the caching module 130.

In one embodiment, the mass storage device 712 or other computer-readable storage media may be encoded with computer-executable instructions that, when loaded into the computer 700, transform the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 has access to computer-readable storage media storing computer-executable instructions that, when executed by the computer, perform the various routines and operations described herein.

The computer 700 may also include an input/output controller 718 for receiving and processing input from a number of input devices, such as a keyboard, a mouse, a touchpad, a touch screen, an electronic stylus, or other type of input device. Similarly, the input/output controller 718 may provide output to a display device, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for efficiently caching data at a client device 104 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for caching one or more Web pages of a Web site at a client device, the computer-implemented method comprising executing instructions in a computer system to perform the operations of:
   computing an aggregate probability for each of the Web pages that defines a probability that any visitor to the Web site will visit the Web pages;
   computing a customer segment probability for each of the Web pages that defines a probability that a visitor to the Web site identified as being a member of a customer segment will visit the Web pages;
   computing a customer-specific probability for each of the Web pages that defines a probability that a specific customer of the Web site will visit the Web pages;
   receiving a request for one of the Web pages from a client device;
   in response to receiving the request, determining whether sufficient information exists about a user of the client device to cache one or more of the Web pages at the client device using the customer-specific probabilities;
   in response to determining that sufficient information exists about the user to cache one or more of the Web pages at the client device using the customer-specific probability data, caching one or more of the Web pages at the client device using the customer-specific probabilities;
   in response to determining that sufficient information does not exist about the user to cache Web pages using the customer-specific probability data, determining whether the user can be mapped to a customer segment;
   in response to determining that the user can be mapped to a customer segment, caching one or more of the Web pages at the client device using the customer segment probabilities; and
   in response to determining that the user cannot be mapped to a customer segment, caching one or more of the Web pages at the client device using the aggregate probabilities.

2. The computer-implemented method of claim 1, wherein Web pages having a computed probability greater than a caching threshold are cached at the client device.

3. The computer-implemented method of claim 2, wherein the Web pages are cached at the client device from a highest to a lowest computed probability.

4. The computer-implemented method of claim 3, wherein the caching threshold is set based upon one or more of a size of a Web page cache at the client device, a network bandwidth to the client device, and a type of the client device.

5. The computer-implemented method of claim 3, wherein the caching threshold is periodically adjusted based upon one or more cache performance metrics.

6. A non-transitory computer-readable storage medium having computer-executable instructions stored thereupon which, when executed by the computer, cause the computer to:
   receive a request for one of a plurality of Web pages of a Web site from a client device;
   in response to receiving the request, to set a caching threshold based upon one or more of a size of a Web page cache at the client device, a network bandwidth to the client device, and a type of the client device; and to use the caching threshold to cache one or more of the Web pages at the client device utilizing probability data, wherein customer-specific probability data is utilized to cache the Web pages at the client device in response to a determination that a user of the client device can be identified, wherein customer segment probability data is utilized to cache the Web pages at the client device in response to a determination that the user of the client device cannot be identified but the user of the client device can be mapped to a customer segment, and wherein aggregate probability data is utilized to cache the Web pages at the client device in response to a determination that the user of the client device cannot be identified and the user of the client device cannot be mapped to a customer segment.

7. The computer-readable storage medium of claim 6, wherein Web pages having a computed probability greater than a caching threshold are cached at the client device.

8. The computer-readable storage medium of claim 7, having further computer-executable instructions stored thereupon which, when executed by the computer, cause the computer to adjust the caching threshold periodically based upon one or more cache performance metrics.

9. The computer-readable storage medium of claim 6, wherein the Web pages are cached at the client device from a highest to a lowest computed probability.

10. An apparatus for caching one or more Web pages of a Web site at a client device, the apparatus comprising:
   at least one processor; and
   a computer-readable storage medium having a client application stored thereon which, when executed on the at least one processor, causes the apparatus to cache one or more Web pages of a Web site at a client device utilizing customer-specific probability data in response to a determination that a user of the client device can be identified,
   to cache one or more Web pages of a Web site at a client device utilizing customer segment probability data in response to a determination that the user of the client device cannot be identified but the user of the client device can be mapped to a customer segment, and
   to cache one or more Web pages of a Web site at a client device utilizing aggregate probability data in response to a determination that the user of the client device cannot be identified and the user of the client device cannot be mapped to a customer segment.

11. The apparatus of claim 10, wherein the aggregate probability data is computed based upon aggregate historical behavior of visitors to the Web site.

12. The apparatus of claim 10, wherein the customer segment probability data is computed based upon historical behavior of visitors to the Web site identified as members of a customer segment.

13. The apparatus of claim 10, wherein the customer-specific probability data is computed based upon historical behavior of identified visitors to the Web site.

14. The apparatus of claim 10, wherein Web pages having a computed probability greater than a caching threshold are cached at the client device.

15. The apparatus of claim 14, wherein the caching threshold is based upon one or more of a size of a Web page cache at the client device, a network bandwidth to the client device, and a type of the client device.

16. The apparatus of claim 15, wherein the caching threshold is periodically adjusted based upon one or more cache performance metrics.

17. The apparatus of claim 16, wherein the Web pages are cached at the client device from a highest to a lowest computed probability.

* * * * *